Dec. 9, 1958     C. R. SUMMERS, JR     2,863,931
POLYMERIZATION OF OLEFINS
Filed Feb. 28, 1955
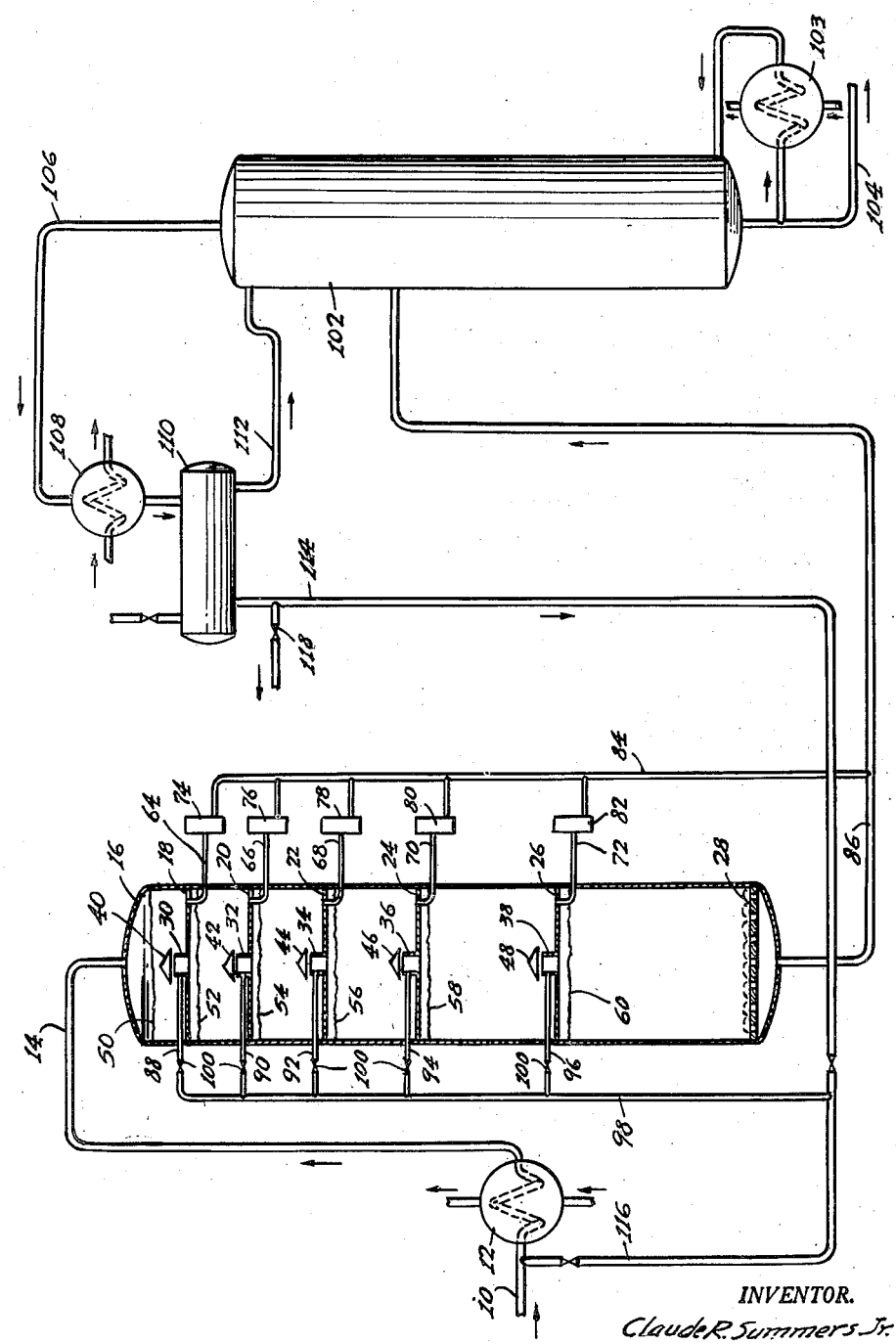
INVENTOR.
Claude R. Summers Jr.
BY
ATTORNEYS

United States Patent Office 2,863,931
Patented Dec. 9, 1958

2,863,931

POLYMERIZATION OF OLEFINS

Claude R. Summers, Jr., Havertown, Pa., assignor to Gulf Oil Corporation, Pittsburgh, Pa., a corporation of Pennsylvania Application February 28, 1955, Serial No. 491,066

6 Claims. (Cl. 260—683.15)

This invention relates to the treatment of normally gaseous olefins and more particularly to an apparatus and process for the polymerization of propylene and butylene.

Gaseous olefins are formed in processes, for example, catalytic cracking, employed in the refining of petroleum hydrocarbons. Olefins such as propylene and butylene are of value primarily for their heating value as a fuel unless converted to other, more valuable, compounds. One process that is used to convert the olefins to more valuable compounds is the polymerization of the gaseous olefins to form liquid hydrocarbons boiling in the gasoline boiling range.

Polymerization of olefins is generally accomplished by passing the gaseous olefins downwardly through an elongated reactor packed with a bed of a polymerization catalyst. Since the polymerization reaction liberates substantial quantities of heat and the rate of polymerization of the gaseous olefins increases with an increase in temperature, it is necessary to cool the reactant gases in the reactor to prevent excessive temperatures. A method commonly employed to control the temperature in the reactor is to quench the reaction by introducing liquid hydrocarbons, which are vaporized at the conditions existing in the reactor, through spray nozzles in the catalyst bed.

Because of the tendency of the polymerization reaction to get out of control, caused by the increase in reaction rate and consequent heat liberated, at high temperatures, it is necessary to avoid hot spots in the catalyst bed. The hot spots are formed as a result of channeling of the gaseous olefins and the liquid reaction products as they pass downwardly through the bed which results in localized hot spots in the quiescent areas and high liquid and gas velocities, with resultant poor conversion, in the channels through the catalyst bed in which the major portion of the reactants passes. The channeling has been found to be aggravated by the presence of a mixed phase of liquid reaction product and unpolymerized gases, since the liquid phase material tends to channel even more readily than the gaseous material. Another factor contributing to the existence of hot spots is the difficulty in cooling the reactant materials uniformly as they pass downwardly through the catalyst bed. This difficulty is also aggravated by the existence of a mixture of liquid product and unpolymerized gases in the catalyst bed.

The high rate of polymerization occurring at hot spots causes over-polymerization which often continues far enough to form massive coke deposits. These coke deposits impair the activity of the catalyst and also tend to plug the catalyst bed, thereby diminishing the rate at which the reactant materials can be passed through the bed. If the temperature of the feed is lowered, or the amount of quench material increased, sufficiently to avoid the formation of coke, the wide variation in the temperatures existing at different points in the catalyst beds of reactors heretofore available results in substantial cold areas in which the rate of polymerization is so low as to cause poor over-all conversion in the reactor.

This invention resides in apparatus and a process for the catalytic polymerization of gaseous olefins in which the gaseous olefins are passed downwardly through a vertically arranged series of beds of a polymerization catalyst in a vertical cylindrical reactor, polymerized liquid product is withdrawn at each of the beds, unpolymerized gaseous olefins separated from the withdrawn liquid are passed in a restricted stream to the next lower bed in the series, and a hydrocarbon quenching medium, gaseous at the conditions in the reactor, is introduced into the restricted stream of unpolymerized gaseous olefins.

The drawing diagrammatically illustrates apparatus and a flow sheet of this invention.

The charge stock to the polymerization process of this invention is generally a mixture of hydrocarbons boiling primarily in the C–3 and C–4 range. The charge stocks ordinarily are about 30 to about 70 percent olefins, the remainder being saturated hydrocarbons which serve as a diluent aiding in the control of the temperature in the reactor. Approximately 20 to 40 percent of the usual charge stock boils in the C–3 range and 60 to 80 percent in the C–4 range; however, the charge stock can be either C–3 or C–4 fractions, or any mixture of the two. A typical charge stock is one containing approximately 65 percent olefins with 20 to 25 percent of the olefins boiling in the C–3 range and 75 to 80 percent boiling in the C–4 range.

The charge stock is introduced through a line 10 into a preheater 12 in which it is heated to a temperature in the range of about 200° to 350° F., preferably from 320° to 350° F., for introduction through a line 14 into the top of a reactor 16. In some instances it may not be necessary to provide a separate preheater 12 to adjust the temperature of the charge stock to the desired range, since the charge stock may be at a suitable temperature when delivered from previous refinery processes.

The reactor 16 is a vertical, cylindrical vessel closed at its upper and lower ends having a series of horizontal trays 18, 20, 22, 24 and 26 mounted in it to divide the reactor into a vertical series of zones. The trays 18, 20, 22, 24 and 26 are annular plates having standpipes 30, 32, 34, 36 and 38, respectively, secured in the central openings and extending upwardly above the trays to form wells in which liquid product is collected. The standpipes 30, 32, 34, 36 and 38 are covered by high hats 40, 42, 44, 46 and 48, respectively, which are spaced from the upper ends of the standpipes to allow the passage of gas under the high hats into the standpipes.

The reactor 16 has been illustrated with 5 trays positioned along its length merely for purposes of illustration. Either a smaller or larger number of trays can be employed and the selection of the desired number of trays will be made as a result of a balance between the loss in total volume of the catalyst in the reactor caused by installation of the trays, the added cost of the reactor, and the improvement in operations resulting from the more uniform conditions caused by the trays. Generally, not more than five trays will be employed. A single tray dividing the reactor into two zones will give some improvement in operation. The trays are preferably spaced at progressively increasing distances from the inlet to the outlet of the reactor because of the more rapid reaction rate near the inlet of the reactor. In a reactor having trays dividing it into three catalyst beds a preferred spacing of trays is approximately 20 percent of the catalyst volume in the top bed, 30 percent in the middle bed, and 50 percent in the bottom bed.

A bed of polymerization catalyst is supported on each of the trays 18, 20, 22, 24 and 26 and grid 28. The polymerization catalyst can be any of the conventional solid catalysts promoting the polymerization of olefins. An example of a catalyst used in commercial polymerization processes is an acid film catalyst consisting of a film of phosphoric acid on a dense, non-porous support such as finely ground quartz having a particle size in the range of 20 to 35 mesh. Another commercial catalyst is an impregnated catalyst in which a siliceous support such as kieselguhr is impregnated with phosphoric acid. The impregnated support may be in any convenient form, for example, granules or pellets approximately one-fourth inch in diameter. The beds of catalyst on the trays extend upwardly to the levels indicated by reference numerals 50, 52, 54, 56, 58 and 60 below the next higher tray or the upper end of the reactor 16 to provide space for the distribution of gaseous olefins in the manner hereinafter described.

Each of trays 18, 20, 22, 24 and 26 is provided with a liquid drawoff line indicated by reference numerals 64, 66, 68, 70 and 72, respectively, opening at the upper surface of the trays for the removal of liquid product from the trays. The liquid drawoff lines are connected to liquid level controllers 74, 76, 78, 80 and 82, which maintain a level of liquid on the trays to prevent discharge of unpolymerized gases through the drawoff lines. The liquid level controllers are connected to a liquid product delivery line 84 which discharges into a line 86 carrying unpolymerized gases and liquid reaction products from the bottom of the reactor. Suitable screens are provided on each of the trays and the grid 28 to prevent the catalyst particles from being washed out of the catalyst beds by the liquid product.

The reactor is maintained at a temperature ranging from about 300° to about 400° F. In those instances in which the temperature of the charge stock is below 300° F., the temperature at the upper end of the reactor will be below 300° F. until the heat of polymerization is sufficient to raise the temperature of the reacted gases above 300° F. It is preferred that a temperature near the upper limit of 400° F. be employed in order to increase the rate of conversion to polymerized liquid products. Temperatures above 400° F. are objectionable because of the very high reaction rate at those temperatures which cause over-polymerization and coking.

The reactor 16 is maintained at a pressure ranging from about 125 p. s. i. to about 400 p. s. i. It is preferred that the pressure on the reactor be as low as possible consistent with the condensation of the reaction product to the liquid state at the temperatures existing in the reactor.

Quench lines 88, 90, 92, 94 and 96 extend from a quenching medium supply line 98 into the standpipes 30, 32, 34, 36 and 38, respectively. Valves 100 are provided in the quench lines to allow optimum distribution of the total quenching medium among the several quench lines for control of the temperature throughout the reactor.

In the process of this invention, the gaseous olefins entering the top of the reactor pass through the catalyst bed on tray 18. A part of the gases are polymerized to form a liquid reaction product which is collected on the tray 18 and withdrawn through line 64 and level controller 74. The uncondensed gases, herein identified as unpolymerized gases, pass between the high hat 40 and the upper end of the standpipe and then downwardly through the standpipe. The restricted passage in the standpipe causes mixing of the unpolymerized gases which reduces variations in temperature and composition of the unpolymerized gases which may result from channeling through the catalyst bed. A hydrocarbon quenching medium is introduced through line 88 into the restricted stream of gases flowing down through standpipe 30. The quenching medium is immediately vaporized to form a substantially uniform mixture of gases at a uniform temperature which flows into the space between the level 52 of the catalyst bed on tray 20 and the lower surface of tray 18. The unpolymerized gases then pass through the catalyst bed on tray 20 where further polymerization occurs.

The process of withdrawing polymerized liquid product is repeated on each of the trays and the unpolymerized gases are passed downwardly through each of the standpipes to the next lower catalyst bed. The gases ordinarily are quenched in each of the standpipes and the amount of quench will be adjusted by means of valves 100 to maintain the desired temperature in each of the catalyst beds; however, in some instances it may not be necessary or desirable to add quench at each of the standpipes to obtain optimum operation. Liquid polymerized product formed in the catalyst bed supported by grid 28 is withdrawn along with the unpolymerized gases from the bottom of the reactor 16 through line 86.

The material used for quenching the polymerization reaction is a mixture of hydrocarbons which is preferably supplied as a cooled liquid and is vaporized on introduction into the reactor. A preferred quenching medium is a recycle stream from the stabilizer cooled to a temperature of approximately 115° to 135° F. and apparatus is illustrated for use of that stream for quenching. The recycle stream has a higher paraffin content than the liquid charge stock to the reactor which can also be employed as a quenching medium. It is important that the quenching medium be gaseous at the conditions existing in the reactor to insure uniform quenching of the unpolymerized gases and to reduce channeling through the next lower catalyst bed.

The total amount of quenching medium introduced into the reactor will depend upon the temperature at which the reactor is maintained and the temperature of the fresh feed to the reactor. The amount of recycle introduced into the reactor as quench will range from about 35 percent of the fresh feed when the reactor is maintained at 400° F. to about 80 percent of the fresh feed when the reactor is maintained at 320° F.

The mixture of polymerized liquid product and unpolymerized gases is delivered through line 86 into a stabilizer 102 in which the unpolymerized gases are stripped from the liquid reaction product. Stabilizer 102 is a distillation tower which may be of conventional design containing perforated trays, bubble caps, packing, or other suitable means for obtaining contact between the liquid and vapor phases therein. Heat for the stripping is provided by conventional means such as a reboiler 103. The liquid reaction product is delivered from the bottom of stabilizer 102 through line 104. Unpolymerized gases are discharged from the upper end of the stabilizer 102 through a line 106 and condensed in a condenser 108.

The condensed unpolymerized gases are delivered from the condenser to a storage drum 110. A portion of the condensed unpolymerized gases is returned to the stabilizer through line 112 as reflux. Another portion of the condensed unpolymerized gases is discharged from drum 110 and delivered through a line 114 either to the quenching medium supply line 98 or a recycle line 116. The recycle liquid passing through recycle line 116 is mixed with the charge stock and delivered to the top of the reactor. Condensed unpolymerized gases in excess of the requirements for reflux, recycle and quenching are discharged from the system through a line 118. If charge stock is used as a quenching medium, it can be introduced as a liquid from a source, for example, line 10, through a line 116 into quenching medium supply line 98.

In a specific embodiment of this invention a reactor having an internal diameter of 9 feet and a height of 44 feet, has 4 trays and a grid mounted therein to provide 5 separate beds of catalyst. The trays are spaced in such a manner that the beds, from the top bed to the bottom bed occupy, respectively, 12½, 12½, 16, 25 and 34 percent of the total volume of the catalyst. Charge stock is introduced into the reactor at the rate of 170 barrels per hour, liquid volume, and a temperature of 320° F. The reactor is maintained at a temperature of 350° F. and a pressure of 250 p. s. i. gauge. The analysis of the charge stock is as follows:

| | |
|---|---|
| Propene | 13.7 |
| Propane | 6.3 |
| Butanes | 27.3 |
| Total butenes | 52.7 |

Stabilizer recycle is returned to the reactor at a total rate of 135 barrels per hour and a temperature of 124° F. Of the total recycle, 110 barrels per hour are introduced through the quench lines. Twenty percent of the quenching medium is introduced into the top standpipe, 20 percent into the second standpipe, 20 percent into the third standpipe and 40 percent into the bottom standpipe.

The process of this invention is of principal utility in improving the conversion, preventing the formation of massive coke deposits in the catalyst bed and providing and improved temperature control. The analysis of the stabilized liquid product is not appreciably changed from that obtained in normal operations giving a product having the following analysis.

| | Percent |
|---|---|
| Hexenes | 13.4 |
| Heptenes | 16.4 |
| Octenes | 29.7 |
| Nonenes | 9.3 |
| 334° F. midpoint material | 22.6 |
| 419° F. midpoint material | 7.8 |

The process of this invention breaks up the channeling that exists in the polymerization reactors packed with solid catalysts which have been available in the past. The removal of the liquid phase at intervals in the tower prevents over-polymerization of the liquid, in addition to reducing channeling, increases the time available for unpolymerized olefins to contact the catalyst and increases the catalyst exposed to unpolymerized olefins in the charge stock, thereby increasing the conversion to polymerized products. The introduction of the quenching medium into the restricted stream of unpolymerized gases discharged from each of the catalyst beds in the reactor results in a substantially uniform temperature of the gas entering the next catalyst bed. The resultant more uniform temperature throughout the reactor allows the operation of the reactor at a higher average temperature without danger of hot spots. In the preferred form of the invention in which the quenching medium is part of the stabilizer recycle stream the unconverted olefins discharged from the stabilizer are passed over the catalyst a second time to improve conversion to polymerized liquid product.

I claim:

1. A process for the polymerization of $C_3$ and $C_4$ olefins to form a liquid polymerized product comprising passing the olefins in a gaseous mixture of hydrocarbons having an olefin content of about 30 to 70 percent downwardly through a series of beds of a solid polymerization catalyst in a single vertical cylindrical reactor, collecting polymerized liquid product at the bottom of each of the catalyst beds, withdrawing the collected polymerized liquid product from the reactor at each of the catalyst beds, passing unpolymerized gases through a restricted passage from one catalyst bed to the next lower catalyst bed in the series, and introducing a liquid hydrocarbon quenching medium gaseous at the conditions existing in the reactor into the restricted passage to cool the unpolymerized gases.

2. A process for the polymerization of $C_3$ and $C_4$ olefins in the presence of a solid polymerization catalyst to form a liquid product comprising passing the olefins in a gaseous mixture of hydrocarbons having an olefin content of about 30 to 70 percent downwardly through a vertically arranged series of beds of a solid polymerization catalyst in a vertical cylindrical reactor, withdrawing polymerized liquid product at each of the beds, passing unpolymerized gaseous olefins separated from the withdrawn liquid downwardly in a restricted stream to the next lower bed of catalyst in the series, and introducing a hydrocarbon quenching medium gaseous at the conditions in the reactor into the restricted stream of unpolymerized gaseous olefins passing from one bed to the next lower bed.

3. A process for the polymerization of $C_3$ and $C_4$ olefins in the presence of a solid polymerization catalyst to form a liquid product comprising passing the olefins in a gaseous mixture of hydrocarbons having an olefin content of about 30 to 70 percent downwardly through a vertically arranged series of beds of a solid polymerization catalyst in a vertical cylindrical reactor, withdrawing polymerized liquid product at each of the beds, passing unpolymerized gaseous olefins separated from the withdrawn liquid downwardly in a restricted stream to the next lower bed of catalyst in the series, and introducing fresh charge stock into the restricted stream of unpolymerized gaseous olefins passing from one bed to the next lower bed.

4. Apparatus for the polymerization of gaseous olefins to produce polymerized liquid product comprising a vertical substantially cylindrical reactor having an inlet at its upper end and an outlet at its lower end, horizontal trays within the reactor dividing the reactor into a vertical series of sections, a bed of a solid polymerization catalyst on each of the trays, a standpipe of small diameter relative to the trays on each of the trays extending above the upper surface of the tray and providing a passage of restricted cross-section from above to below the tray, a quenching medium line extending into the reactor and opening into each of the standpipes, and a withdrawal line extending from each of the trays out of the reactor.

5. Apparatus for the polymerization of olefinic gases to produce a polymerized liquid product comprising a single vertical cylindrical reactor having an inlet and an outlet, a tray within the reactor dividing the reactor into an upper zone and a lower zone, a bed of a solid polymerization catalyst in each of the zones, a standpipe of small diameter relative to the trays extending above the upper surface of the tray and providing a restricted passage through the tray, a liquid withdrawal line extending from the tray out of the reactor, and a quenching line extending inwardly through the reactor and opening into the reactor in the passage of the standpipe.

6. Apparatus for the polymerization of gaseous olefins to form a polymerized liquid product comprising a single vertical cylindrical reactor having an inlet and an outlet, a plurality of horizontal trays mounted at intervals in the reactor dividing the reactor into a series of zones, a bed of a solid polymerization catalyst on each of the trays having its upper surface spaced from the lower surface of the next higher tray, a conduit of small diameter relative to the tray extending through the tray, said conduit having its upper end opening above a tray and its lower end opening below the tray and above the upper surface of the bed of catalyst on the next lower tray to provide a restricted passage for gases to below the tray, means for withdrawing liquid from the reactor at each of the trays, and a line for a quenching medium extending inwardly through the reactor and opening into the restricted passage.

References Cited in the file of this patent

UNITED STATES PATENTS

| | | |
|---|---|---|
| 2,176,354 | Nelson | Oct. 17, 1939 |
| 2,256,622 | Murphree et al. | Sept. 23, 1941 |
| 2,263,266 | Forney | Nov. 18, 1941 |
| 2,337,419 | Sensel | Dec. 21, 1943 |
| 2,348,836 | Nagle | May 16, 1944 |
| 2,411,760 | Sensel | Nov. 26, 1946 |
| 2,470,904 | Shanley | May 24, 1949 |
| 2,770,665 | Corn | Nov. 13, 1956 |

UNITED STATES PATENT OFFICE
CERTIFICATE OF CORRECTION

Patent No. 2,863,931                                      December 9, 1958

Claude R. Summers, Jr.

It is hereby certified that error appears in the printed specification of the above numbered patent requiring correction and that the said Letters Patent should read as corrected below.

Column 5, line 20, for "and improved" read -- an improved; column 6, line 60, strike out -- to below the tray --.

Signed and sealed this 7th day of April 1959.

(SEAL)
Attest:

KARL H. AXLINE
Attesting Officer

ROBERT C. WATSON
Commissioner of Patents